United States Patent [19]

Shanley, Jr.

[11] 4,285,618

[45] Aug. 25, 1981

[54] ROTARY MILLING CUTTER

[76] Inventor: Stephen E. Shanley, Jr., 9434 Lakewood, Grosse Ile, Mich. 48188

[21] Appl. No.: 84,073

[22] Filed: Oct. 12, 1979

[51] Int. Cl.³ .......................... B26D 1/12; B23B 51/00
[52] U.S. Cl. ......................................... 407/54; 407/57; 407/59; 407/61; 407/63; 408/223; 208/230
[58] Field of Search .................. 407/53, 54, 55, 56, 407/57, 58, 59, 60, 61, 62, 63; 408/223, 224, 226, 227, 228, 229, 230

[56] References Cited

U.S. PATENT DOCUMENTS

| 684,043 | 10/1901 | Bohne . |
| 889,829 | 6/1908 | Valentine et al. . |
| 960,525 | 6/1910 | Erlandsen . |
| 1,328,430 | 1/1920 | Hathaway . |
| 1,492,505 | 4/1924 | Bonnaffous et al. . |
| 1,630,602 | 5/1927 | Blanco . |
| 1,851,613 | 3/1932 | Albee . |
| 2,396,289 | 3/1946 | Ross . |
| 2,441,143 | 5/1948 | Gracey . |
| 2,855,657 | 10/1958 | Erhardt . |
| 2,918,955 | 12/1959 | Simas . |
| 3,058,199 | 10/1962 | Cave et al. . |
| 3,129,492 | 4/1964 | Strausmann . |
| 3,548,476 | 12/1970 | Cave et al. . |
| 3,667,857 | 6/1972 | Shaner et al. . |
| 3,736,634 | 6/1973 | Sonnie ................................. 407/54 |
| 3,863,316 | 2/1975 | Yeo ..................................... 408/230 |
| 3,882,912 | 5/1975 | Sybertz ............................... 144/172 |
| 4,174,915 | 11/1979 | Peetz et al. ......................... 407/59 |
| 4,199,284 | 4/1980 | Kress et al. ......................... 407/114 |

FOREIGN PATENT DOCUMENTS 212618  3/1924  United Kingdom .................... 408/223

OTHER PUBLICATIONS

TELA TOOL Corp., Catalog 0178.
Nachi End Mills, Price Catalog No. T005-NA, Jul. 1, 1978, pp. 11, 12 and 2 cover pp. (4 pp.).

Primary Examiner—Harrison L. Hinson
Attorney, Agent, or Firm—Sutherland, Asbill & Brennan

[57] ABSTRACT

The milling cutter of the invention comprises a cutting section having a plurality of blades positioned on the surface and separated one from the other by flutes. At least two blades have one or more smooth segments, exhibiting an even and unbroken land and cutting edge, interspersed with one or more serrated segments containing a row of cutting teeth. The positions of the smooth and serrated segments are staggered from blade to blade so that in the course of one complete revolution of the cutter, each point along a surface being worked by the cutter will be contacted by at least one smooth segment and at least one serrated segment.

27 Claims, 9 Drawing Figures

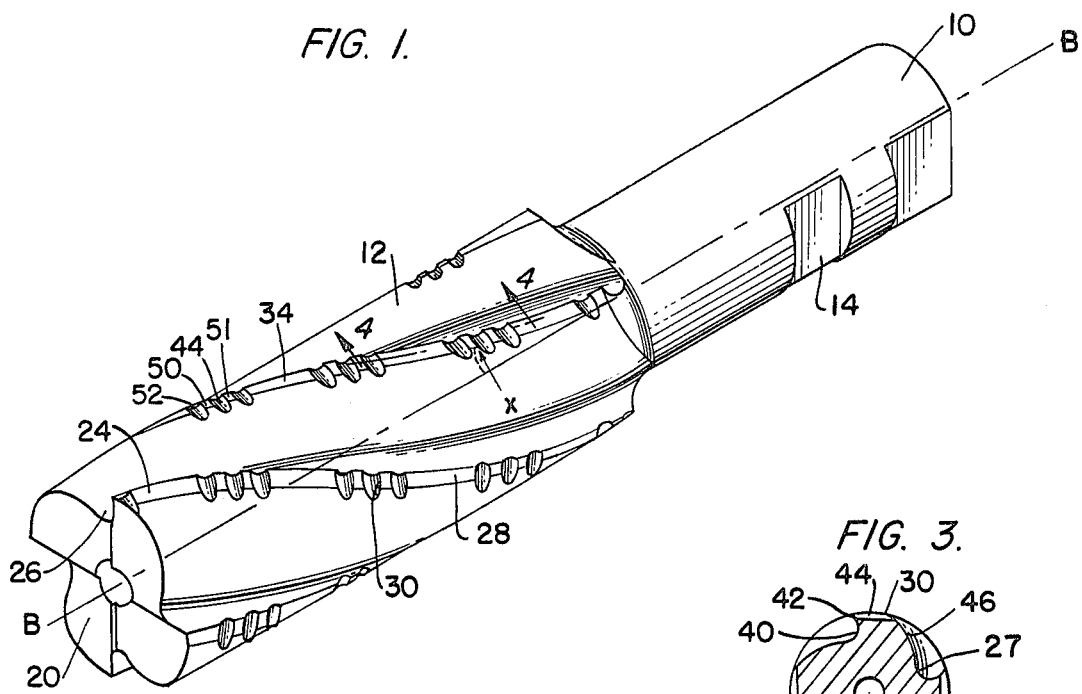
FIG. 1.
FIG. 3.
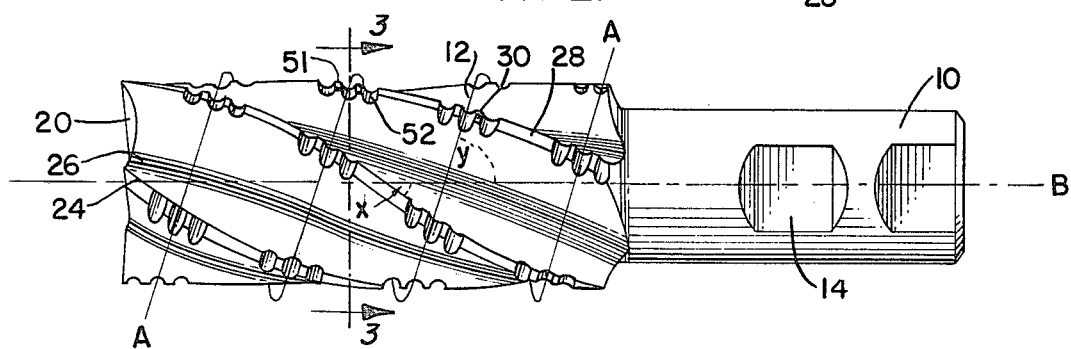
FIG. 2.
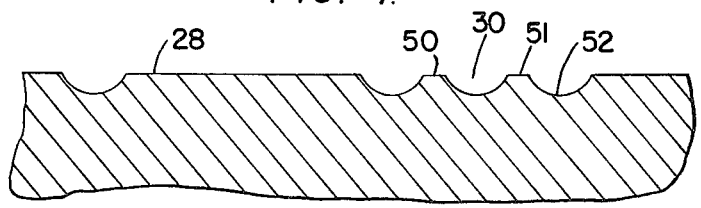
FIG. 4.

ROTARY MILLING CUTTER

BACKGROUND OF THE INVENTION

This invention relates to a rotary cutting tool, and more particularly to a rotary cutting tool in which at least two of the cutting blades thereof have one or more smooth segments and one or more serrated segments. The milling cutter described herein may be utilized in either an end cutting or side cutting operation.

Milling cutters known in the prior art have been capable of providing either a rapid cutting capability ("roughing cutters") or a close dimensional smooth surface finish ("finishing cutters"); however, so far as applicant is aware, none of the commercially available cutters is capable of providing both rapid cutting and smooth, close dimensional finish qualities simultaneously and satisfactorily. Roughing cutters known in the art produce such deep grooves and gouges in the workpiece that a machinist cannot "work to a line" (dimension). As a result, a tool change or adjustment usually is necessary to hold dimensional tolerance and produce the desired surface finish, if the milling job is to be completed within a reasonable period of time.

It is well known that the addition of chip-breaking cutting teeth upon the blades of a rotary cutting tool will improve the cutting speed of the tool, but will leave scratches, gouges and grooves in the workpiece. The use of smooth blades produces a more uniform, polished surface finish, but at the cost of higher energy consumption and reduced cutting speed. It is the object of this invention to provide a milling cutter which combines the desirable qualities of smooth and serrated cutting blades so as to produce, in a short production time and without the necessity of a tool change, a work piece milled to the desired tolerance at the finish line and exhibiting a satisfactory surface finish.

SUMMARY OF THE INVENTION

The milling cutter of the invention comprises a generally cylindrical shank section joined to a cutting section, the cutting section consisting essentially of a hard metal body whose surface has formed into it a plurality of blades separated by flutes, each blade having a leading side, a cutting edge on the leading side, a land, and a trailing face side; at least two of the blades having at least one smooth segment, wherein the land and cutting edge are even and unbroken, and at least one serrated segment, wherein the land consists essentially of a row of cutting teeth, adjacent teeth in the land being separated from each other by a transverse groove in the blade, the smooth and serrated segments being located in staggered positions from blade to blade, so that in the course of one complete revolution of the cutter, each point along a surface being worked by the cutter will be contacted by at least one smooth segment and at least one serrated segment. Stated otherwise, a diametrical plane perpendicular to the axis of the cutter and passing through any point along said axis of the cutting section will intersect at least one smooth cutting segment and one serrated cutting segment to thereby contact and work any point of a workpiece being cut with a smoothing and a serrated segment portion of cutting edge.

The milling cutter of the invention is primarily useful in either an end cutting or a side cutting process. In an end cutting process, the cutter digs a slot or trough in the metal stock, whereas in a side cutting process the periphery of the tool is presented to the vertical side of the workpiece.

The invention may be used with milling cutters having cutting sections formed into any of the configurations commonly used in the miling cutter art. For example, the cutting section may take the general form of a cylinder, having a cutting end, i.e., the end opposite the shank, which may be substantially flat (e.g., as in an "end mill") or rounded (e.g., as in a "ball nose end mill"). Cylindrical cutting sections are used to quickly remove large amounts of stock from the workpiece in a side cutting process, or to end cut a slot having straight sides. In such an end-cutting process, the shape of the cutting end will determine the shape of the bottom of the slot (e.g., a ball nose end mill will cut a slot with a radius on its bottom). Alternatively, the sides of the workpiece may be angled by using a cutter whose cutting section is in the general shape of a frustum (e.g. as in a "tapered cutter"). Such a cutting section may narrow in a direction away from the shank (e.g., an "angle cutter") or toward the shank (e.g., a "reverse angle cutter," used to cut dovetail slots). Such a frusto-conical cutter may have concave sides (e.g., a "radius cutter") if desired.

The blades and flutes can either extend straight down the sides of the cutting section, parallel to the axis of the shank, or they can extend around the cutting section in a helical direction. Straight blades and flutes are less expensive to manufacture, but are rougher on milling equipment, because of the repeated shocks as each blade strikes the workpiece.

The helical blade arrangement is often preferred, because when using that type of cutter a portion of a blade is always in contact with the workpiece, and the blades tend to slice off cuttings, rather than chip them away. The helix angle of such blades is preferably about 10 to 40 degrees, measured from a line which is parallel to the axis of the shank section of the cutter.

The blades and flutes of the cutter of the present invention are formed according to conventional practice with respect to the shape and size of the flutes, the width of the lands, and the configurations of the leading side and trailing face side of the blades. A cutter having a relatively large number of blades is preferred over a tool with only two or three blades, because with the greater number of blades each blade takes a smaller bite, thus giving an easier cut and reducing the frequency with which the cutter must be sharpened. However, as more blades are added to the tool, the radius of the cutting section must be increased, thus limiting the situations in which the tool can be used.

As will be described in greater detail with reference to the attached drawings, it is preferred that the serrated segments on the blades of the cutter of this invention be so located that in the course of one complete revolution of the cutter, substantially all points along a surface being worked by the cutter will be contacted the same number of times by a serrated segment. An advantageous way of accomplishing that is to have essentially all of the serrated segments be substantially equal in length, and essentially all of the smooth segments be substantially the same length also, and have the serrated segments arranged in such a pattern from blade to blade that a continuous, imaginary line passing across each blade at precisely the midpoint of each serrated segment would define a helix of uniform angle around the cutting section, e.g., in the range of about 60 to 85 degrees, measured from a line which is parallel to the shank section. If the blades also extend in a helical direction around the cutter, the imaginary line helix may have either the same lay as that of the blades, or it may have the opposite lay. In other words, one helix can be right-handed and the other left-handed, or they can both be the same. Generally, the cutter will be capable of faster metal removal if the lay of the helical serration pattern is opposite that of the blades.

Regardless of the individual lengths of the serrated segments, it is preferred that the sum of their lengths constitute about 40 to 50 percent of the total blade length on the cutter.

Where the cutting section has four or more blades having serrated segments, and the serrated segments are so arranged that in the course of one complete revolution of the cutter each point on the workpiece will be contacted by at least two such segments, it is preferred that the teeth in those serrated segments be slightly offset from segment to trailing segment, so that a groove of one serrated segment is followed by a tooth of the next serrated segment, and vice versa.

The teeth in the serrated segments may be formed with crests that are flat, rounded or sinusoidal; flat crests are often preferred because they generally give better wear. The walls of the between-teeth grooves can be straight or curved, and the grooves' bottoms may be flat or rounded. Grooves having parabolic cross-sections are generally preferred, e.g. as in U.S. Pat. No. Re. 26,544 to Castor.

The direction, or lay, of the transverse grooves in the serrated segments of the blades can be perpendicular to the axis of the shank section, or slanted with respect thereto, for example at an angle of about 60 to 90 degrees. When slanted grooves are used in a helical blade cutter, the direction of the slant (i.e., the lay of the groove) can be in the same direction as the lay of the blades, or it can be opposite thereto.

Similarly, in a cutter in which the serrated sections are arranged in a helical pattern, the between-teeth grooves, if slanted with respect to the axis of the cutter, may slant in the same direction as the helical serration pattern, or in the opposite direction. For ease of production, however, it is preferred that they slant in the same direction, and that the angle and position of the between-teeth grooves be such that the grooves define a series of parallel, discontinuous spirals extending in a helical direction from blade to blade around the body of the cutting section. Such grooves can be relatively easily formed by slowly turning the cutter on a lathe, while feeding a form tool along the length of the cutting section.

The milling cutter of the invention combines the desirable qualities of roughing cutters and finishing cutters of the prior art. Each serrated segment of the tool is capable of rapidly cutting the workpiece near to the desired form. Following behind the serrated segment on the rotating tool, the smooth segment clips off the peaks left by the serrated segment and finishes the surface uniformly. The total energy required to operate the cutter may be substantially less than that of other milling cutters, apparently because each blade carries less cutting load, due to the combination of smooth and serrated segments. Moreover, the heat build-up in the cutter and the workpiece may be reduced.

The claimed milling cutter generally creates less overcut or undercut when milling to a blind corner or changing direction, and therefore allows an operator to form sharp corners in the workpiece, because the tool usually will not overshoot or "walk" when used in this manner. This desirable quality apparently results from the reduced cutting load on each flute, which tends to diminish the inherent pulling power of each blade's cutting edge.

The claimed milling cutter has the advantage that chips and shavings cut by it from the workpiece are generally shorter, less thick and less stringy or curly than those created by conventional finishing cutters. As a consequence, the chips and shavings are easily carried up the body of the tool, away from the cutting surface, so as not to clog the cutting surface.

These and other advantages and objects of the invention will become more readily apparent from the following detailed description, when taken in concert with the accompanying drawings.

BRIEF DESCRIPTION OF THE DRAWINGS

FIG. 1 of the drawings is a view in perspective of one embodiment of the milling cutter of the present invention;

FIG. 2 is a side elevational view of the tool shown in FIG. 1;

FIG. 3 is a transverse cross sectional view taken along line 3—3 of FIG. 2;

FIG. 4 is a longitudinal cross section taken along line 4—4 of FIG. 1, showing the profile of one embodiment of a blade containing smooth and serrated segments;

DETAILED DESCRIPTION OF PREFERRED EMBODIMENTS

FIG. 1 illustrates a preferred embodiment of the milling cutter of the invention. The cutter comprises a generally cylindrical shank section 10 joined to a cutting section 12. The shank section 10 has a flat 14 for holding the cutter in the chuck of a milling machine. The diameter of the shank need not be identical to the diameter of the cutting section, as may be seen by comparing the tool of FIG. 1, in which the shank has a smaller diameter than the cutting section, to the tool of FIG. 7, in which the diameter of the shank 10" is the same as the diameter of the cutting section 18.

Figure 7:
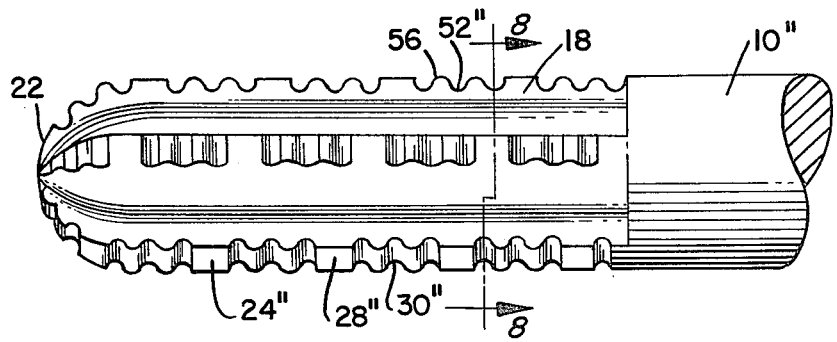
FIG. 7 is a side elevational view of a third embodiment of the milling cutter of the invention.

The cutting section is a hard metal body which may assume any of many shapes which are well-known in the milling cutter art. For example, as illustrated in FIG. 1, the cutting section 12 may have the general configuration of a cylinder having a cutting end 20 which is substantially flat; alternatively, as illustrated in FIG. 7, the cylindrical cutting section 18 may have a cutting end 22 which is rounded. The cutting section also may assume any of several variations of a frustrum: in FIG. 5, for example, the cutting section 16 narrows in a direction away from the shank. The body and end of the cutting section are formed according to conventional practice depending upon the particular uses to which the tool will be put.

Figure 5:
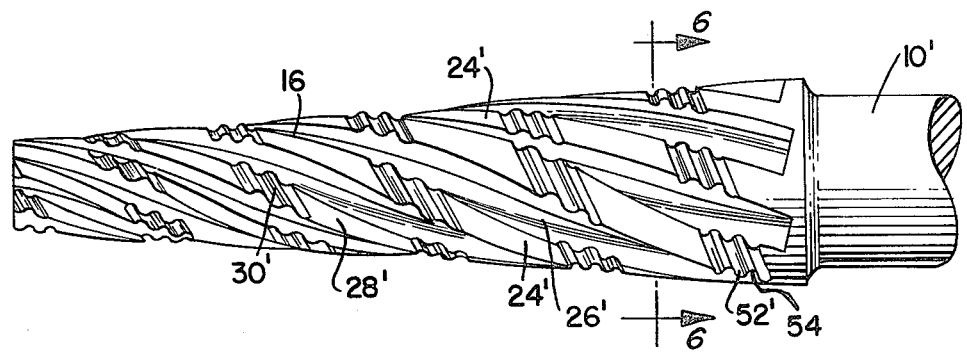
FIG. 5 is a side elevational view of another embodiment of the milling cutter of the invention.
Figure 6:
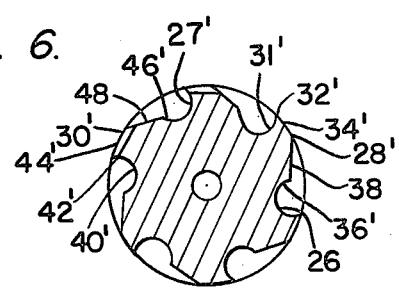
FIG. 6 is a transverse cross sectional view taken along line 6—6 of FIG. 5 showing a second embodiment of the trailing face of the blades.
Figure 8:
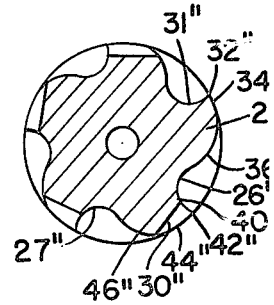
FIG. 8 is a transverse cross sectional view taken along line 8—8 of FIG. 7.
Figure 9:
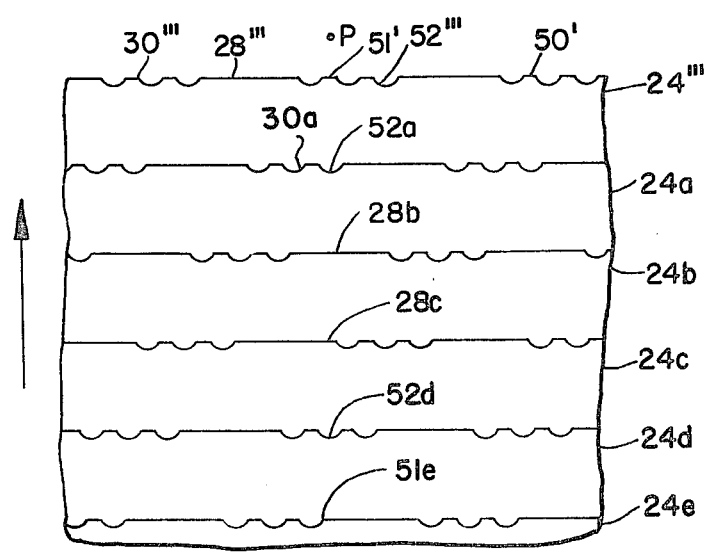
FIG. 9 is a developed profile view of the cutting edges on each of the six blades of a milling cutter of the invention.

The surface of the cutting section has formed into it a plurality of blades (24 in FIGS. 1-4, 24' in FIGS. 5 and 6, 24" in FIGS. 7 and 8, 24''' in FIG. 9). Each blade is separated from the next by a flute (26 in FIGS. 1-4, 26' in FIGS. 5 and 6, 26" in FIGS. 7 and 8). In a preferred embodiment, the blades and flutes extend in a helical direction around the body of the cutting section, as illustrated in FIG. 2 (blades 24) and FIG. 5 (blades 24'). However, the blades and flutes may take an axial configuration on the cutting section, as is demonstrated in FIG. 7, wherein blades 24" and flutes 26" extend in a straight line from the shank to the cutting end of the cutting section.

At least two of the blades have at least one smooth segment (28 in FIGS. 1-4, 28' in FIGS. 5 and 6, 28" in FIGS. 7 and 8, 28''' in FIG. 9) and at least one serrated segment (30 in FIGS. 1-4, 30' in FIGS. 5 and 6, 30" in FIGS. 7 and 8, 30''' in FIG. 9). In FIG. 3 there is illustrated in cross section a smooth segment 28 of a blade, having a leading side 31 which merges in concave fashion into an even, unbroken cutting edge 32. Immediately behind the cutting edge 32 is a flat land 34, which leads to a trailing face side 36 and thence to the flute 26 separating one blade from the following blade. In some configurations of the blade, see FIG. 6, the flat land 34' is followed at a slight angle of about 5 to 20 degrees by a flat relief zone 38, thence to the trailing face side 36'. Similarly, as illustrated in FIGS. 1-4, a serrated segment 30 of a blade consists of a leading side 40, a cutting edge 42, a land 44 and a trailing face side 46 leading to a flute 27; as shown in FIG. 6, a flat relief zone 48 may fall between the land 44' and the trailing face side 46'.

The serrated segment of a blade differs from the smooth segment of a blade in the composition of the land. As may be seen in FIG. 1, the land 34 of a smooth segment of a blade is even and unbroken along the entire length of the segment; in the serrated segment, however, the land 44 is formed into a row of cutting teeth 50, in which adjacent teeth are separated from each other by a transverse groove 52. The composition of a serrated segment of a blade may be compared with the composition of a smooth segment when seen in cross section along the blade, as in FIGS. 4 and 9.

The crests of the cutting teeth on a serrated segment of a blade may be flat, rounded, or sinusoidal. In the preferred embodiment shown in FIGS. 1-4 the crests 51 of teeth 50 are flat. In FIG. 9 the crests 51' of teeth 50' are also flat. Examples of rounded tooth crests 54 may be seen in FIG. 5, and of sinusoidal tooth crests 56 in FIG. 7. Each tooth crest shape provides individual cutting qualities best suited for a differing type of workpiece. The cutting teeth of each serrated segment of the cutter are formed according to conventional practice with respect to the depth and shape of the grooves, the sine ratio of sinusoidal tooth crests, and the radius of rounded tooth crests.

The grooves (52 in FIGS. 1-4, 52' in FIGS. 5 and 6, 52" in FIGS. 7 and 8, 52''' in FIG. 9) separating adjacent cutting teeth in one serrated segment of a blade need not be identical in dimension or lay to the between-teeth grooves in other serrated segments on the cutter. As mentioned earlier, however, for ease of production it may be desirable to construct the tool in such a fashion that the grooves follow each other from blade to blade along one or more discontinuous spirals extending in a helical direction around the cutting section. The lay of the spiral of the grooves may be the same as the lay of the spiral of the blades, but at a different helix angle, as is seen in FIG. 5; it also may be opposite that of the blades, as is seen in FIGS. 1 and 2. For some applications, however, it may be found desirable to arrange the grooves at an angle of approximately ninety degrees, measured from a line which is parallel to the axis of the shank section, as is seen in FIG. 7. In a preferred embodiment of the invention, illustrated in FIGS. 1-4, the grooves 52 form a discontinuous spiral extending around the cutting section in a helical direction of the opposite lay as the blades 24, at a helix angle which is the same as the helix angle y of the imaginary line A—A connecting the midpoints of each serrated segment 30.

Departing from milling cutters revealed in the prior art, the cutter of the present invention employs at least two blades having one or more smooth segments and one or more serrated segments in combination. The lengths of the smooth and serrated segments may be varied, depending upon the use to which a given cutter will be put. FIG. 5 shows a cutter wherein essentially all of the smooth segments are substantially the same length, but each smooth segment is longer than each serrated segment. Alternatively, FIG. 7 shows a cutter wherein the serrated segments are slightly longer than the smooth segments. In the preferred embodiment illustrated in FIGS. 1 and 2, every blade has smooth and serrated segments and each segment, except some of the end fragments, is substantially the same length, the serrated segments thereby constituting about 50 percent of the total blade length on the cutter.

In the preferred embodiment of the invention illustrated in FIGS. 1 and 2, the blades 24 and flutes 26 extend in a helical direction around the cutting section 12, and a continuous, imaginary line A—A passing across each blade at precisely the midpoint of each serrated segment 30 extends in a helical direction of the opposite lay as the blades 24, the blades 24 describing a helix angle x of about 20 degrees and the imaginary line A—A describing a helix angle y of about 80 degrees, both angles being measured from a line B—B which is parallel to the axis of the shank section.

As described above, in the preferred embodiment of the invention the positions of the cutting teeth on each serrated segment are staggered, or offset, from blade to blade so as to cause a groove to follow each tooth when the tool is rotated about the axis of its shank. Where the between-teeth grooves in the serrated segments of the blades of such a cutter define discontinuous spirals extending in a helical direction from blade to blade around the body of the cutting section, the teeth may be arranged in that offset manner by selecting the proper angle of spiral for the grooves. This preferred embodiment is best realized in a cutter having four or more blades.

FIG. 9 presents a developed profile view of a tool constructed according to the teaching of this preferred embodiment. The arrow shows the direction of rotation. For illustrative purposes, there are six blades and each cutting tooth 50' on each serrated segment 30" of a blade is flat; however, this embodiment is not limited to any specific number of blades or shape of cutting tooth. As each blade 24, 24a, 24b, etc., is presented successively to the workpiece, a given point P on that workpiece will be acted upon first by tooth crest 51', then by groove 52a following as part of the serrated segment on the following blade; the point P then will be acted upon by one or more smooth segments 28b, 28c, thence by another groove 52d and tooth crest 51e. Following every cutting tooth crest 51' there is either a groove 52" or at least one smooth segment 28".

The configuration represented schematically in FIG. 9 produces a milling cutter of extraordinary power and finishing qualities. Any irregularity in the workpiece which may have been caused by the action of a cutting tooth crest 51' will be acted upon by one or more smooth segments 28" in the course of the same revolution of the cutter. The tendency of the cutting teeth to create gouges in the workpiece is diminished further, because the groove 52a of the next serrated segment 30a will protect such irregularities from being exacerbated by the action of another cutting tooth following immediately behind the first.

It will be understood that many modifications and variations are possible in light of the above teachings, without departing from the scope and spirit of the invention as hereinafter claimed.

What I claim is:

1. A milling cutter comprised of a generally cylindrical shank section joined to a cutting section, the cutting section consisting essentially of a hard metal body whose surface has formed into it a plurality of blades separated by flutes, each said blade having a leading side, a cutting edge on the leading side, a land, and a trailing face side; at least two of said blades having at least one smooth segment, wherein the land and cutting edge are even and unbroken, and at least one serrated segment, wherein the land consists essentially of a row of cutting teeth, adjacent teeth in the land being separated from each other by a transverse groove in the blade; said smooth and serrated segments being located in staggered positions from blade to blade, so that a diametrical plane perpendicular to the axis of the cutter and passing through any point along said axis of the cutting section will intersect at least one smooth cutting segment and one serrated cutting segment to thereby contact and work any point of a workpiece being cut with a smoothing and a serrated segment portion of cutting edge.

2. The cutter of claim 1, wherein said cutting section has the general configuration of a frustum.

3. The cutter of claim 2, wherein said cutting section has the general configuration of a cylinder.

4. The cutter of claim 2 or 3, wherein said blades and flutes extend in a helical direction around the body of the cutting section.

5. The cutter of claim 1, wherein said cutting section has the general configuration of a cylinder and the cutting end is rounded.

6. The cutter of claim 1, wherein said cutting section has the general configuration of a frustum and the cutting section narrows in a direction away from the shank.

7. The cutter of claim 1, wherein the diameter of the shank section differs from the diameter of the cutting section.

8. The cutter of claim 1, wherein said blades have a flat relief zone between said land and said trailing face side.

9. The cutter of claim 1, wherein the crests of said cutting teeth are flat.

10. The cutter of claim 1, wherein the crests of said cutting teeth are rounded.

11. The cutter of claim 1, wherein essentially all of the serrated segments not at the ends of the blades are substantially the same length, and essentially all of the smooth segments not at the ends of the blades are substantially the same length.

12. The cutter of claim 1, wherein each of the blades of the cutter has at least one said smooth segment and at least one said serrated segment.

13. The cutter of claim 12, wherein the angle and position of the between-teeth grooves in the serrated segments are such that the grooves define a series of parallel, discontinuous spirals extending in a helical direction from blade to blade around the body of the cutting section.

14. The cutter of claim 12, wherein the serrated segments constitute about 40 to 50 percent of the total blade length on the cutter.

15. The cutter of claim 14, wherein the angle and position of the between-teeth grooves in the serrated segments are such that the grooves define a series of parallel, discontinuous spirals extending in a helical direction from blade to blade around the body of the cutting section.

16. The cutter of claim 12, wherein essentially all of the serrated segments not at the ends of the blades are substantially the same length, and essentially all of the smooth segments not at the ends of the blades are substantially the same length.

17. The cutter of claim 16, wherein the serrated segments are arranged in such a pattern from blade to blade that a continuous, imaginary line passing across each blade at precisely the midpoint of each serrated segment would define a helix of uniform angle around the cutting section.

18. The cutter of claim 17, wherein said blades and flutes extend in a helical direction around the cutting section, and said imaginary line through the serrated segment midpoints extends in a helical direction of the opposite lay as said blades.

19. The cutter of claim 18, wherein the helix angle of said blades is about 10 to 40 degrees, and the helix angle of said imaginary line is about 60 to 85 degrees, both angles being measured from a line which is parallel to the axis of the shank section.

20. The cutter of any of claims 17, 18 or 19, wherein the helix angle of the imaginary line is such that, when the cutter is rotated about the axis of its shank, each groove of one serrated segment is followed by a tooth of the next following serrated segment.

21. The cutter of claim 17, wherein the angle and position of the between-teeth grooves in the serrated segments are such that the grooves define a series of parallel, discontinuous spirals extending in a helical direction from blade to blade around the body of the cutting section.

22. The cutter of claim 21, wherein the angle of the spirals defined by the between-teeth grooves is substantially the same as the helix angle of said imaginary line.

23. The cutter of claim 22, wherein the helix angle of said imaginary line is about 60 to 85 degrees, measured from a line which is parallel to the axis of the shank section.

24. The cutter of claim 23, wherein said blades and flutes extend in a helical direction around the body of the cutting section.

25. The cutter of claim 24, wherein said imaginary line through the serrated segment mid-points extends in a helical direction of the opposite lay as said blades.

26. The cutter of claim 25, wherein the helix angle of said blades is about 10 to 40 degrees, measured from a line which is parallel to the axis of the shank section.

27. The cutter of any of claims 24, 25 or 26, wherein there are at least four blades in the surface of the hard metal body.

* * * * *